US007209261B2

(12) United States Patent
Krueger et al.

(10) Patent No.: US 7,209,261 B2
(45) Date of Patent: Apr. 24, 2007

(54) COLOR MANAGEMENT SYSTEM

(75) Inventors: Sharon A. Krueger, Webster, NY (US); Jay A. Glaspy, Jr., Rochester, NY (US)

(73) Assignee: Xerox Corporation, Stamford, CT (US)

( * ) Notice: Subject to any disclaimer, the term of this patent is extended or adjusted under 35 U.S.C. 154(b) by 936 days.

(21) Appl. No.: 10/021,034

(22) Filed: Dec. 19, 2001

(65) Prior Publication Data

US 2002/0124027 A1    Sep. 5, 2002

Related U.S. Application Data

(60) Provisional application No. 60/258,077, filed on Dec. 22, 2000.

(51) Int. Cl.
*G06F 15/00* (2006.01)
(52) U.S. Cl. ............... 358/1.9; 358/1.13; 358/1.15; 358/1.1; 382/167
(58) Field of Classification Search ............. 358/1.9, 358/1.13, 1.15, 1.1; 382/167
See application file for complete search history.

(56) References Cited

U.S. PATENT DOCUMENTS

| 6,037,950 | A | 3/2000 | Meir et al. |
| 6,307,961 | B1 * | 10/2001 | Balonon-Rosen et al. .. 382/167 |
| 2002/0075505 | A1 * | 6/2002 | Murray ..................... 358/1.15 |
| 2003/0140315 | A1 * | 7/2003 | Blumberg et al. .......... 715/527 |
| 2004/0046971 | A1 * | 3/2004 | Lapstun et al. ............. 358/1.1 |
| 2005/0141008 | A1 * | 6/2005 | Billow et al. ............. 358/1.13 |

\* cited by examiner

*Primary Examiner*—Kimberly Williams
*Assistant Examiner*—Michael Burleson

(57) ABSTRACT

A method for applying individualized rendering parameters a single page basis to enable rendering of image data associated with a job having a plurality of pages includes: assigning a first set of color processing options to a first group of pages in the job; assigning a second set of color processing options to a second group of pages in the job, the second set of color processing options identifying a color space transformation profile; receiving a page of image data to be rendered; selecting a color space transformation profile for the received page of image data based on the second set of color processing options; and applying the selected color space transformation profile to render the page of image data.

7 Claims, 6 Drawing Sheets

100

| | Attribute | Queue Attribute | Job Attribute | Page Attribute |
|---|---|---|---|---|
| 101 | RGB Source | Y | Y | Y |
| 102 | CMYK Source | Y | Y | Y |
| 103 | CMY Source | Y | Y | Y |
| 104 | Device Gray Source | Y | Y | Y |
| 105 | Profile for Front Side | Y | Y | Y |
| 106 | Profile for Back Side | Y | Y | Y |
| 107 | Emulation Selection | Y | Y | Y |
| 108 | Rendering Intent | Y | Y | Y |
| 109 | Stock Name | Y | Y | N |
| 110 | Color | Y | Y | N |
| 111 | Weight | Y | Y | N |
| 112 | Front Side Coating | Y | Y | N |
| 113 | Back Side Coating | Y | Y | N |
| 114 | Front Side White Point | Y | Y | N |
| 115 | Back Side White Point | Y | Y | N |
| 116 | Opacity | Y | Y | N |
| 117 | Lightness | Y | Y | Y |
| 118 | Contrast | Y | Y | Y |
| 119 | Color Cast | Y | Y | Y |
| 120 | Saturation | Y | Y | Y |
| 121 | Trapping | Y | Y | Y |
| 122 | Anti-Aliasing | Y | Y | Y |
| 123 | Monochrome Printing of Color Documents | Y | Y | Y |
| 124 | Black Overprint | Y | Y | Y |

| Attribute | Queue Attribute | Job Attribute | Page Attribute |
|---|---|---|---|
| RGB Source | Y | Y | Y |
| CMYK Source | Y | Y | Y |
| CMY Source | Y | Y | Y |
| Device Gray Source | Y | Y | Y |
| Profile for Front Side | Y | Y | Y |
| Profile for Back Side | Y | Y | Y |
| Emulation Selection | Y | Y | Y |
| Rendering Intent | Y | Y | Y |
| Stock Name | Y | Y | N |
| Color | Y | Y | N |
| Weight | Y | Y | N |
| Front Side Coating | Y | Y | N |
| Back Side Coating | Y | Y | N |
| Front Side White Point | Y | Y | N |
| Back Side White Point | Y | Y | N |
| Opacity | Y | Y | N |
| Lightness | Y | Y | Y |
| Contrast | Y | Y | Y |
| Color Cast | Y | Y | Y |
| Saturation | Y | Y | Y |
| Trapping | Y | Y | Y |
| Anti-Aliasing | Y | Y | Y |
| Monochrome Printing of Color Documents | Y | Y | Y |
| Black Overprint | Y | Y | Y |

FIG. 1

COLOR MANAGEMENT SYSTEM

Priority is claimed from Provisional Application No. 60/258,077 filed Dec. 22, 2000.

BACKGROUND

This invention relates generally to image rendering devices used with full color image output terminals. More particularly, the present invention is directed to a system and method of color management in a digital image processing system.

Image rendering systems must be able to process increasingly more complex documents as well as support an increasing range of output media. Digital imaging devices, particularly electrophotographic and inkjet devices, have been able to provide documents containing photo quality color images. The ability to obtain high quality images from printing and reproduction devices has led to an increased use of photographic and pictorial objects in documents. Furthermore, the ability to include photo-quality pictorial objects in documents has expanded the type of documents that users create with the rendering systems.

The increased availability of high quality digital imaging devices has brought color processing and imaging applications to a wider range of users. In the past, the typical user of a high quality color imaging device obtained a good understanding of color processing and color controls through training and experience and could properly adjust a given document to obtain a desired output. The increased availability and use of color imaging devices, have brought a new range of users from the novice to the experienced. Furthermore, this increasing range of users has expanded the range of devices and applications with which color documents are created.

Traditionally, color management systems are designed to provide the best solution linking hardware, software and methodology (workflow and formats) to control and adjust color in an imaging system considering trade-offs between speed, accuracy, cost, efficiency, ease of use, etc. The design of a color management system is an increasingly difficult task given the increased, complex range of color documents created, the increased range of image sources and the wide range of options demanded by users.

Often the requirements and features of a color management system designed for novice users conflict with the features required by more experienced users. Thus, what is needed is a color management system directed to providing automatic color processing aimed at a novice color user while providing specific control of the parameters in the color management path for skilled users.

SUMMARY

In accordance with one aspect of the detailed description below, there is provided a method for applying individualized rendering parameters a single page basis to enable rendering of image data associated with a job having a plurality of pages. The method includes providing a plurality of color space transformation profiles; assigning a first set of color processing options to a first group of pages in the job; assigning a second set of color processing options to a second group of pages in the job, the second set of color processing options identifying a color space transformation profile; receiving a page of image data to be rendered; selecting a color space transformation profile for the received page of image data based on the second set of color processing options; and applying the selected color space transformation profile to render the page of image data.

Pursuant to another aspect described in detail below, there is provided a system for selecting a color space transformation profile to enable rendering image data. The system includes a storage device to store and provide a plurality of color space transformation profiles; an input device to assign a first set of color processing options to a first group of pages in the job and to assign a second set of color processing options to a second group of pages in the job, the second set of color controls identifying a color space transformation profile; a color profile manager to retrieve the identified color space transformation profile from the storage device; and an imager to apply the selected color space transformation profile to the image data.

BRIEF DESCRIPTION OF THE DRAWINGS

Other features of will become apparent as the following description proceeds and upon reference to the drawings, in which:

FIG. 1 shows a table listing attributes that can affect color processing available for programming on a queue, job and page basis;

DETAILED DESCRIPTION

Figure 2:
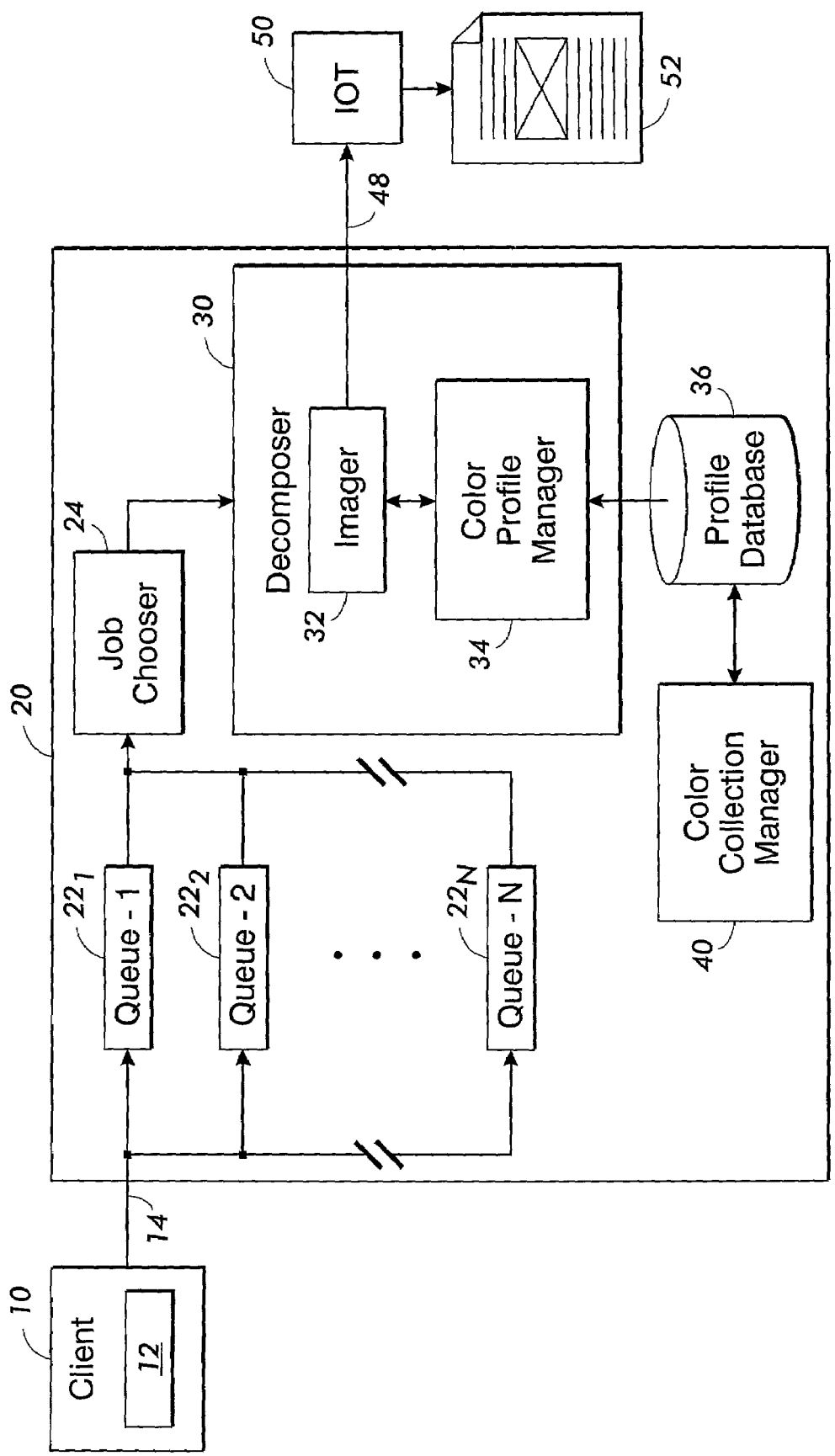
FIG. 2 is a representation of a digital imaging system that incorporates color management features according to the present invention.

In the following detailed description, as well as in the drawings, like referenced numbers represent devices, circuits, or equivalent circuits which perform the same or equivalent functions. The system and method described herein are directed to providing improved color management capabilities within an image processing system such as what is known in the art as a digital front end (DFE). In particular the system and method described below are directed to providing automatic color processing aimed at a novice color user while providing specific control of the parameters in the color management path for skilled users. To achieve the improved color management capabilities, a DFE incorporating features described below allows a user to select different color processing options to be applied on a per page basis. In furtherance of this feature offering color controls on a per page basis, the DFE also provides a method to identify color output processing options for each side of the media. In addition, a DFE incorporating features described below, will provide a method for selecting color-rendering options based on non-color job programming attributes.

As will be discussed in further detail, the improved color management is accomplished, in part, by the incorporation of additional attributes affecting color processing (referred to herein as color-related attributes) into the existing set of job programming attributes available for selection on a job, a page exception or a queue basis when configuring and submitting a print job. FIG. 1 shows a table 100 listing those attributes that can affect the color processing of a print job. Specifically, the table of FIG. 1 lists color-related attributes in the first column and provides an indication of whether those attributes are available for programming on a queue, job and page basis in the second, third and fourth columns. While there are numerous job programming attributes available, table 100 will be limited to color-related attributes (i.e., those job attributes that can affect the color processing of a print job). Each of the color-related attributes listed in table 100 of FIG. 1 is briefly explained below.

Attributes 101, 102, 103 and 104 (the first four attributes in table 100) comprise the group of source selection attributes. Source selection attributes comprise those attributes directed to input color space transformation profiles. Briefly reviewing, there are a number of different formats in which an image and the color space transformation of that image may be represented. One specific type of format is defined by the International Color Consortium (ICC). As will be discussed below, the present invention beneficially implements the ICC paradigm. To this end, the source selection attributes, when specified, identify an ICC source profile defining the behaviors of the source on which the color data was created for use in translating device dependent color data into profile connection space (PCS).

Specifically, the source selection attributes include the following color attributes: RGB Source, CMYK Source, CMY Source and Device Gray Source. The value for each of these attributes can be either unspecified or the specific ICC source profile to use. With the value unspecified, the DFE will provide a default ICC profile. That is, selecting a specific ICC source profile will allow input source interpretation via the selected profile. When assigning a value to the above attributes, a user is beneficially provided with a list of the source profiles currently loaded on the DFE. Preferably, each installed source profile will have an associated symbolic name and it is this list of symbolic names that will be made available for queue, page exception and job programming of source profiles. Beneficially, this list of symbolic names identifying the currently available profiles is made available for page and job programming regardless of where the programming is performed (i.e. local on the DFE or remote at a client submission station).

Furthermore, for each of the above attributes the present invention incorporates the ability to associate a source profile with specific object types. That is, a user will have the ability to specify either (1) an ICC source profile to use for all objects types on the page or (2) separate ICC profiles for use with one or more of text, graphics and image objects. For example, a user can assign one source profile to image objects and a second to the text and graphics objects. Similarly, a user can assign one source profile to image objects, a second to the text objects and a third profile to graphics objects. Moreover, the present invention includes the ability to select options for each of the above spaces independently. This enables pages with objects in different device spaces to be interpreted according to the user selection.

Explicit job programming of the source profiles provides a user with the capability to specify the interpretation of the "undefined" device dependent color data in their document. Here, "undefined" device dependent source space means that the PDL file does not contain any specification that indicates the transformation to be used to convert the device dependent source space into a device independent source space. This is useful in the situation where a user may have a file that contains no information about the source color data, but is aware that the images in the file were obtained from a known scanner. Upon programming the job to use the source profile for this scanner, the "undefined" source color data within the file will be interpreted correctly.

Attributes 105 and 106 of table 100 comprise destination profile selection attributes. Destination profile selection attributes provide the ability to select a specific ICC destination profile to be used in rendering a print job. Specifically, this group includes two attributes, destination profile front side and, if duplex, destination profile back side. In programming these attributes, a user can either specify a specific ICC destination profile to use, specify "System Specified" or remain unspecified. Furthermore, each attribute (front side and back side) is independent of the other. As with the source selection attributes, when assigning a value to the destination profile attributes, a user beneficially can choose from a list of the destination profiles currently loaded and available at the DFE.

As should be apparent to those skilled in the art, a variety of job attributes including media attributes, rendering intent and emulation can affect the output color quality. For example, different color adjustments must be made while processing a job if it is being printed on white paper with a gloss coating as compared to off-white paper with no coating. These adjustments are accounted for by characterizing each individual media for the supported print engine, and these characterizations can be stored in the form of ICC profiles. Additionally, each object type (images, graphics, text) may have a different rendering intent (color interpretation, gamut mapping, and rendering) which would be included in the ICC profile. As will be discussed below, the present invention considers these factors and identifies the appropriate ICC destination profile to use. In this regard, when the value of the destination profile attribute is "System Specified", the appropriate destination profile is identified as described above. Alternatively, selecting a specific ICC profile with the destination profile selection attributes provides the ability to override the system selection and perform the color space transformation in accordance with the named profile.

The emulation selection attribute 107 provides the ability to select an emulation mode supported by the output device. The values for the emulation selection include: none, use printer default, or one of the supported emulation modes (e.g., SWOP, SWOP coated, enhanced SWOP). Furthermore, the emulation selection can remain unspecified. As with each of the color attributes, when unspecified, the DFE determines a value to use.

The rendering intent attribute 108 identifies the desired rendering intent of the output. The values for the rendering intent attribute include: none, use printer default, or one of the supported rendering intents. Here again, the attribute can remain unspecified and the DFE will provide an appropriate value. The present invention also incorporates the ability to identify a specific rendering intent with specific object types. That is, a user will have the ability to specify a rendering intent for use with all objects on the page or a specific rendering intent for each of text, graphics and image objects. Examples of a possible rendering intent include saturation, relative colorimetric, absolute colorimetric, perceptual, all-in-one and pure.

The user can define media attributes (attributes 109–116) that, in the absence of a specified destination profile choice, the DFE will use to find a proper destination profile for rendering data. Color related media attributes include: stock name, color, weight, coating (for front and back sides), white point (for front and back sides), and opacity. Some, all, or none of these attributes can be defined by the user.

The color space adjustment attributes that can be set on a page, job and queue basis include: lightness, contrast, color cast, and saturation (attributes 117–120). The user will be able to select specific adjustments for each control independently.

Job attributes 121–124 fall into the group of imaging parameters and include, for example, trapping, anti-aliasing, black overprint and monochrome printing. Each of these attributes can be set independently of the others and can be applied on a job and/or page basis as well as assigned at a queue. A brief explanation of each attribute follows.

Trapping is an image processing technique used to compensate for misregistration in the print engine. When color planes are not registered exactly with each other, white gaps and regions of shifted hue appear at object boundaries. Trapping will compensate for these image quality defects by using chokes and spreads filled with appropriate colors (derived from the edge colors) to mask the registration problems, resulting in better looking images.

Trapping is well established in the commercial printing market and can be performed in a number of different places in the workflow. Documents can be trapped in creation applications, page layout packages, and stand alone trapping packages, all available for use on the client workstations. These packages all output a PDL which has trapping commands appended to the file (in the form of shapes that "outline" the object borders). Additionally, there are commercially available raster image processors that offer the ability to trap documents even further downstream.

The user will have the ability to request controller based trapping, or to request that no controller based trapping be performed. The user will merely set the trapping control to "on" or "off." The user will have the option of turning the controller based trapping off if they have already trapped their document, have designed the document such that trapping is unnecessary, or do not want the performance hit associated with performing this extra operation.

Anti-aliasing is a method for reducing the jagged appearance (caused by rasterization) of curves and diagonal lines. Typically, to mask this anomaly, edges will be rendered at a higher resolution than that of the print engine, and then be reduced to engine resolution, in the case of black lines, replacing some of the pixels with gray. The result is that the curve or line looks smooth, as the grays and blacks are integrated by the human visual system. The DFE will provide the user with anti-aliasing options on a job or queue basis. The user may choose no anti-aliasing processing or if desired one of several types of anti-aliasing.

In color printing, the standard rendering will remove (or knock out) all the color plane data underneath a full strength black object. With even the smallest amount of misregistration, this knock out causes a band of white to be visible at the edge of any black object (e.g., text, lines) which lies atop a color background. Intelligent Black is an algorithm which automatically detects black objects on color backgrounds, and ensures that these objects are overprinted (color is not completely removed from under them), accomplishing black overprint. The user will have a direct choice of turning this functionality on or off on a page, job, and queue basis. Intelligent Black is offered to the users through two options: Off or On. When OFF, no overprinting will be done (even if it is specified in the PDL). When ON, black objects on all types of color backgrounds will be detected and over printed on that background.

Turning now to FIG. 2, there is shown an embodiment of a digital imaging system that incorporates color management features of the present invention. The system includes three main components: a client, an image processing system, and a print engine. Client 10 operates as a source of the image data to be rendered and output onto suitable media. Image processing system 20 which may comprise what is known in the art as a digital front end (DFE) processes digital image data received from client 10 and converts the image data into binary print ready data that is supplied to a print engine or marker 50. In response to the print ready data, print engine 50 generates an output document 52 on suitable media.

With continued reference to FIG. 2, client 10 which may comprise a computer, a scanner or any similar or equivalent image input terminal (image source) and further includes any applications, drivers and operating system thereon provides digital image data which may comprise any combination of grayscale data, ASCII text characters, bitmap or bytemap images, graphic primitives, high level graphics or page description language (PDL) such as PostScript®, etc. Client 10 further includes print driver 12 or a similar tool for compiling job programming attributes (including color attributes) and assembling the attributes and image data into a print job 14.

Client 10 includes print driver 12 accessible to a user via a graphical user interface (GUI)—not shown. Print driver 12 provides an interface to enable a user to properly select and communicate job programming attributes to DFE 20. Job programming attributes describe selected parameters by which the a print job will be processed and can include parameters for page layout (e.g., size, orientation, duplex), color options (e.g., brightness, contrast, saturation) media type, finishing options (e.g., output tray, collate, staple, binding), etc. In addition to selecting parameters for the print job, the print driver can be used to set additional or alternate job attributes on a per page basis for selected pages. These special attributes to be used for selected pages within a job are often referred to as page exceptions. Similarly, the ability to set different attributes on a per page basis is sometimes referred to as page exception programming.

The use of print drivers to compile job programming attributes and page exceptions is well known in the field of digital printing. In accordance with the color management features of the present invention, DFE 20 extends the attributes available for both job and page exception programming to those color-related attributes identified as being available on a job and page basis in table 100 of FIG. 1. DFE 20 will process the print job 14 according to the programmed job attributes and will process each page exception within the print job according to the page exception programming therein.

DFE 20 includes one or more print queues $22_1$, $22_2$, . . . $22_N$ for receiving input data such as print job 14. Each print queue $22_N$ is configured with a set of queue attributes. The queue attributes provide a set of processing parameters in the same manner as job attributes. Specifically, in accordance with the present invention, the queue attributes identified in table 100 (FIG. 1) can be programmed by a system administrator or similar user. Furthermore, in addition to an attribute value, each queue attribute set on the queue can be independently assigned a queue qualification of either "override" or "default." The value of the queue qualification is used to determine the precedence when reconciling job attributes and queue attributes. In this manner, each queue can be thought of as a virtual printer wherein sending a print job to a queue picks up attributes of that queue.

DFE 20 further includes job chooser 24 which retrieves print jobs from the print queues $22_1$, $22_2$, . . . $22_N$ and reconciles the color attributes set at the client with the color attributes associated with the queue to which the job was submitted thereby generating a set of reconciled attributes. After reconciling the attributes, job chooser 24 passes the print job and reconciled attributes to decomposer 30. At the end of the job chooser reconciliation operation, each color related attribute will have a qualification of either "override" or "default".

Decomposer 30 receives the resolved print job from job chooser 24 and processes the received image data therein to produce print ready data 48 (which may be binary or contone data) that is supplied to a print engine or marker 50. In response to print ready data 48, print engine 50 generates an output document 52 on suitable media. Engine 50 is preferably an electrophotographic engine; however, engine 50 may include such equivalent alternatives as ink jet, ionographic, thermal, etc.

More specifically, decomposer 30 includes imaging manager 32 which may comprise what is generally known in the art as an interpreter and an imager to reconcile the reconciled attributes from job chooser 24 with any attributes embedded in the PDL image data ("internal" qualification) to generate a set of final attributes. The reconciliation of the attributes is based on a precedence model, described below. Given the final set of attributes, imaging manager 32 identifies the source profile and the destination profile to use for color space transformation. It should be noted that imaging manager 32 only identifies the name of the destination profile which may include "System Specified".

Imaging manager 32, using an appropriate source profile, translates the image data from the input color space into a common device independent color space (Profile Connection Space—PCS). Once in the PCS, imaging manager 32 operates on the data to perform any color adjustments requested in the final attributes. The image data is then translated into CMYK data via information in the appropriate destination profile. Once in the CMYK space, imaging manager 32 performs any requested control operations (e.g., trapping, anti-aliasing, halftoning, black overprint, etc.) To perform the color space transformations, imaging manager 32 obtains selected attributes from the set of final attributes and builds a transformation query. The transformation query is passed to color profile manager (CPM) 34 which retrieves the appropriate ICC profile from profile database 36. To support CPM 36 and profile database 36, DFE 20 includes color collection manager (CCM) 40.

Color collection manager 40 maintains profile database 36 which comprises two types of records, profile records (i.e., ICC source and destination profiles) and profile assignment records. Specifically, CCM 40 operates to create, modify, obtain and delete profile records. CCM 40 beneficially includes an associated GUI (not shown) that enables a user to perform the create, modify, obtain and delete operations. Assignment records exist for destination profiles only and are used to associate an ICC destination profile with media attributes and emulation attributes. The following fields define the structure of an ICC destination profile assignment record:

| | |
|---|---|
| Profile Name | symbolic name assigned to the ICC profile. |
| Media Name | symbolic stock name identifying a specific media |
| Color | stock color |
| Weight | stock weight |
| Coating (F/B) | coating of the media - front and back sides |
| White Point (F/B) | media white point - front and back sides |
| Opacity | stock opacity (i.e. transparent, opaque). |
| Emulation | type of output color the profile emulates |

It is through the use of the fields in the assignment records that the CPM 34 identifies and retrieves the appropriate ICC destination profile for color space transformation. Each ICC destination profile need not will have an assignment record associated therewith (i.e., referencing the profile). In such an instance, the destination profiles would be used when the value of destination attribute specifically names the destination profile (i.e. something other than "system specified" or unspecified).

Beneficially, the profile data base includes one assignment record for each named media/stock supported by the DFE. It should be appreciated that there may be more than one assignment record a for each destination profile. That is, different named media may have similar (or even the same) attributes and thus may use the same destination profile. Likewise, a specific stock may have more than one assignment record and more than one destination profile associated therewith. This would be accomplished through the use of different symbolic media names mapped to the same specific stock, as each assignment record must be unique.

To retrieve a destination profile imaging manager 32 compiles a transformation query which includes the values for the reconciled media and emulation attributes which is passed to CPM 34. If the query identifies a specific named ICC destination profile, CPM 34 retrieves that destination profile regardless of the other attributes. If the destination profile is unspecified or "System Specified", CPM 34 searches for any assignment record having an exact match with the attribute values in the query. It should be noted that the values of the query maybe unspecified, in which case the CPM treats the attribute as a don't care. If more than one assignment record contains an exact match with the specified attribute values, CPM performs a conflict resolution operation to identify the destination profile to use. If none of the assignment records is an exact match with the query, CPM 34 performs a best match resolution operation to identify the destination profile.

The ability to program the color processing to associate with each media, to map multiple color renderings (destination profiles) to the same physical media and to map multiple media to the same color processing (destination profile) provides a great deal of flexibility to the system, allow DFE customization for particular environments.

With continued reference to FIG. 2, the reconciliation of attributes at job chooser 24 and imaging manager 32 will now be explained in detail. As described above, the job attributes programmed at the client and the queue attributes are reconciled in accordance with a precedence model. Recall that a color related attribute that is set on a queue may have a qualification of either "override" or "default." The value of a color related attribute on a submitted job will be selected from (in decreasing order of precedence) queue overrides, page exception programming, job programming, internal PDL construct, and finally, queue defaults. Queue overrides, page exception and job programming result in an "override" qualification for the attribute upon job reconciliation, whereas, internal PDL specification and queue defaults result in "internal," and "default" qualifications, respectively.

For example, consider the selection of the source data in device independent color space. DFE 20 will not provide any source profile queue, page exception or job programming parameters to override the specification of the device independent space within the PDL files, e.g., PostScript, PDF, TIFF or PCL5C files. Furthermore, since the source data for the interpretation of device independent space is always present within the PostScript, PDF, TIFF and PCL5C files or, in the case of PostScript and PDF, as system resources, there is no need for queue defaults either. Therefore, the precedence model for device independent space collapses to always processing the "internal" qualification, that is, using the source data specification within the PDL files.

Next, consider the selection of the source data in "undefined" device dependent color space. The precedence model will be applied independently to the source profiles in each of the color spaces. There are two implications of this processing. First, the precedence model for source profiles does not apply across color spaces. Thus, a source profile queue override in one source, say RGB source, will not override the source profile page exception programming for another source space, say CMYK source.

Second, it is conceivable that in one device space, say RGB, the source profile named in a queue is selected if the qualification on the queue for the RGB source profile is an override. On the other hand, in another device space, say CMYK, the source profile named in the page exception programming may be selected if there is no CMYK source profile queue override. In yet another device space, say Gray, there may be no queue overrides, page exception or job programming for the source profile. In this case, the queue default will be used.

Table 1 summarizes a precedence model and indicates the action for the "internal" qualification for each of a variety of common PDL types conventionally supported by a DFE.

grammed by the user on the job or page exceptions, the value on the queue will be used. If it is a named profile, that profile will be used, and, if the value is "System Specified," the system determined algorithm will be used to determine the appropriate destination profile.

The qualification on the queue is "default" for the destination profile attribute, and the destination profile is programmed for the job which may include one or more specific page exceptions for the job. In this example, the value programmed on the job will be used as overridden by any specific page exception programming. The destination profiles programmed for the job/page exception may either be "System Specified" or a named destination profile.

The qualification on the queue is "default" for the destination profile attribute and no destination profile is programmed on the job or page basis. In this example, any rendering information within the PDL will be used if it exists. Otherwise, the value on the queue will be used which

TABLE 1

Precedence Model For Selection Of The Source Color Space Data

| Decreasing order of precedence | Qualification | Device Dependent | Device Independent |
|---|---|---|---|
| Queue Override | Override | Source profile | None |
| Page exception programming | Override | Source profile | None |
| Job Programming | Override | Source profile | None |
| Internal PDL constructs | Internal | None | PostScript:<br>(a) Use the Color Space Dictionary.<br>(b) If UseCIEColor = TRUE, interpret Gray, RGB, CMYK according to the contents of the PS Color Space Dictionary resources<br>PCL5C: Use the information in the CID.<br>TIFF and PDF: Use embedded ICC profile |
| Queue defaults | Default | Source profile | None |

Similarly, a precedence model is used to identify the appropriate destination profile. To this end, consider the following examples.

The qualification on the queue is "override" for the destination profile attribute. Regardless of what is promay either be "System Specified" or a named destination profile.

Table 2 summarizes the precedence model for the selection of the destination profile and also includes the action for the "internal" qualification for embedded PDL.

TABLE 2

Precedence Model For Selection Of The Destination Profile Data

| Decreasing order of precedence | Qualification | Value | Action |
|---|---|---|---|
| Queue Override<br>Page exception programming<br>Job Programming | Override | Named Profile | Use the named destination ICC profile. |
| | | System Specified | Use system defined algorithm to determine destination ICC profile. |
| Internal PDL constructs | Internal | N/A | PostScript - Use CRD if present. Note: The CRD may either be embedded within the PostScript master or commands may exist in the PostScript master to use a system resident CRD in the PostScript ColorRendering |

TABLE 2-continued

Precedence Model For Selection Of The Destination Profile Data

| Decreasing order of precedence | Qualification | Value | Action |
|---|---|---|---|
| | | | resource. |
| | | | PCL5C and TIFF - None. |
| Queue defaults | Default | Named Profile | Use the named destination ICC profile. |
| | | System Specified | Use system defined algorithm to determine destination ICC profile. |

Figure 3:
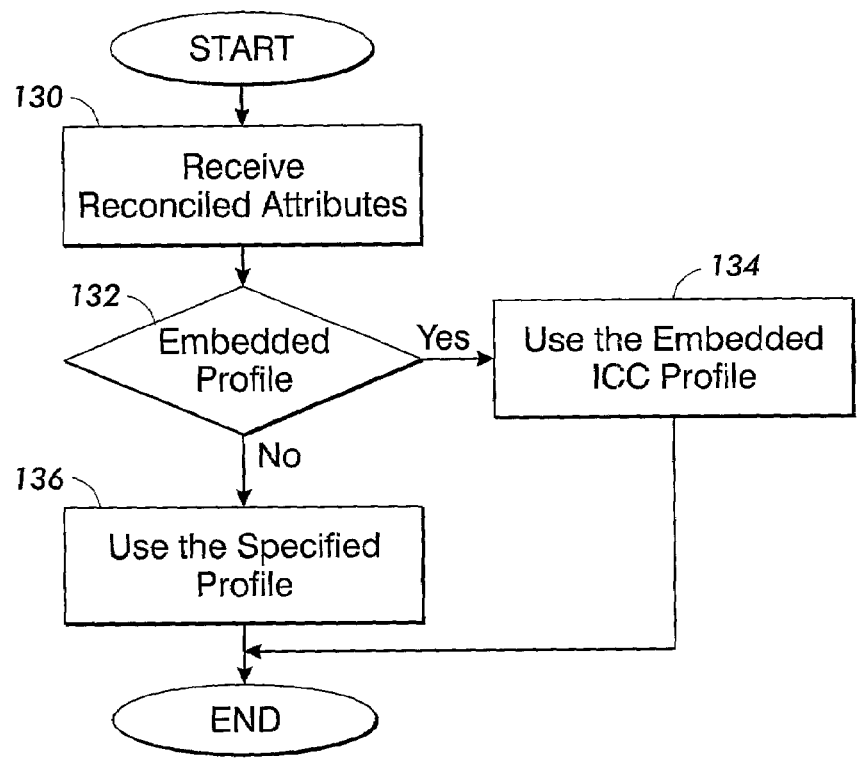
FIG. 3 is a flowchart illustrating the steps in reconciling the source profile attribute for a TIFF file.

Having briefly described the precedence model, the identification of the appropriate source and destination profiles will now be explained. Prior to the interpretation of a page, imaging manager 32 will retrieve the named source ICC profile, the color space, and the object type to which the ICC profile is to be applied. If the image data is in device dependent space, the imaging manager will use the named source profile for the color space present. Referring to FIG. 3, there is shown a flowchart illustrating the steps in reconciling the source profile attribute for a TIFF file. At step 130, imaging manager 32 receives the reconciled attributes for a page from job chooser 24. At step 132, the imaging manager determines if an embedded ICC profile exists, and if so, imaging manager 32 will use the embedded file to convert the image data to the device independent source space. If the image data is in device source space, but there is no embedded ICC profile, imaging manager 32 will first determine the color space of the image in the TIFF file and the object type(s) in the image. The imaging manager will then use the task-specified ICC profile for that same color space and object type (step 136).

Figure 4:
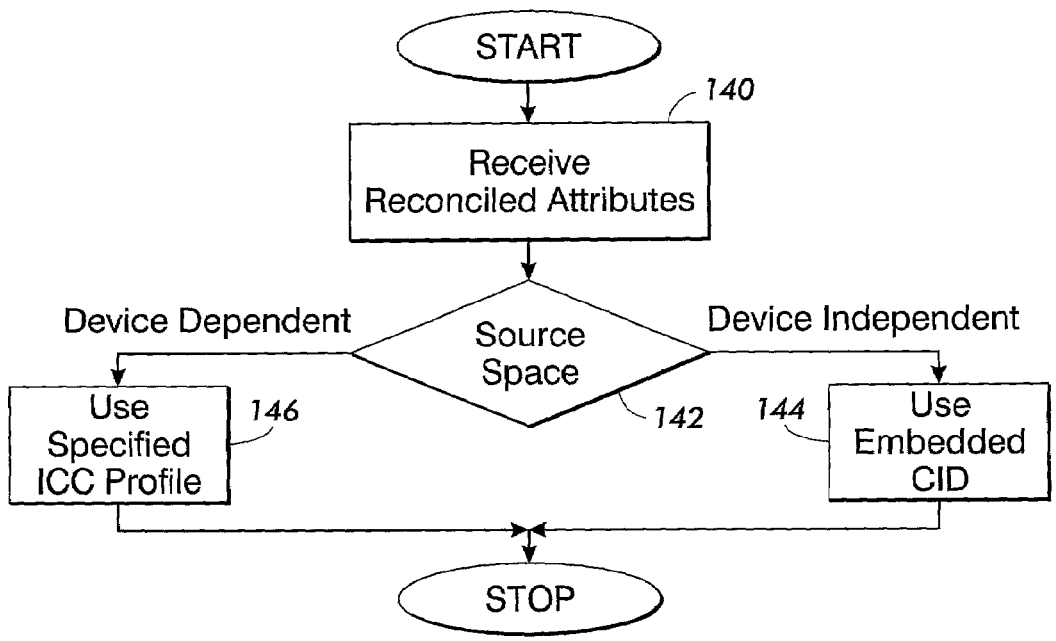
FIG. 4 is flowchart illustrating the steps in resolving the source profile for a PCL5C file.

FIG. 4 shows a flowchart illustrating the steps in resolving the source profile for a PCL5C file. At step 140, imaging manager 32 receives the reconciled attributes for a page from job chooser 24. Next, at step 142, the imaging manager will determine the source color space specified in the CID. If it is device independent, then the appropriate information is extracted from the CID and used (step 144). On the other hand, if it is device dependent, the task-specified ICC profile will be used for the device spaces supported by PCL5C (Gray, RGB and CMY) at step 146.

Figure 5:
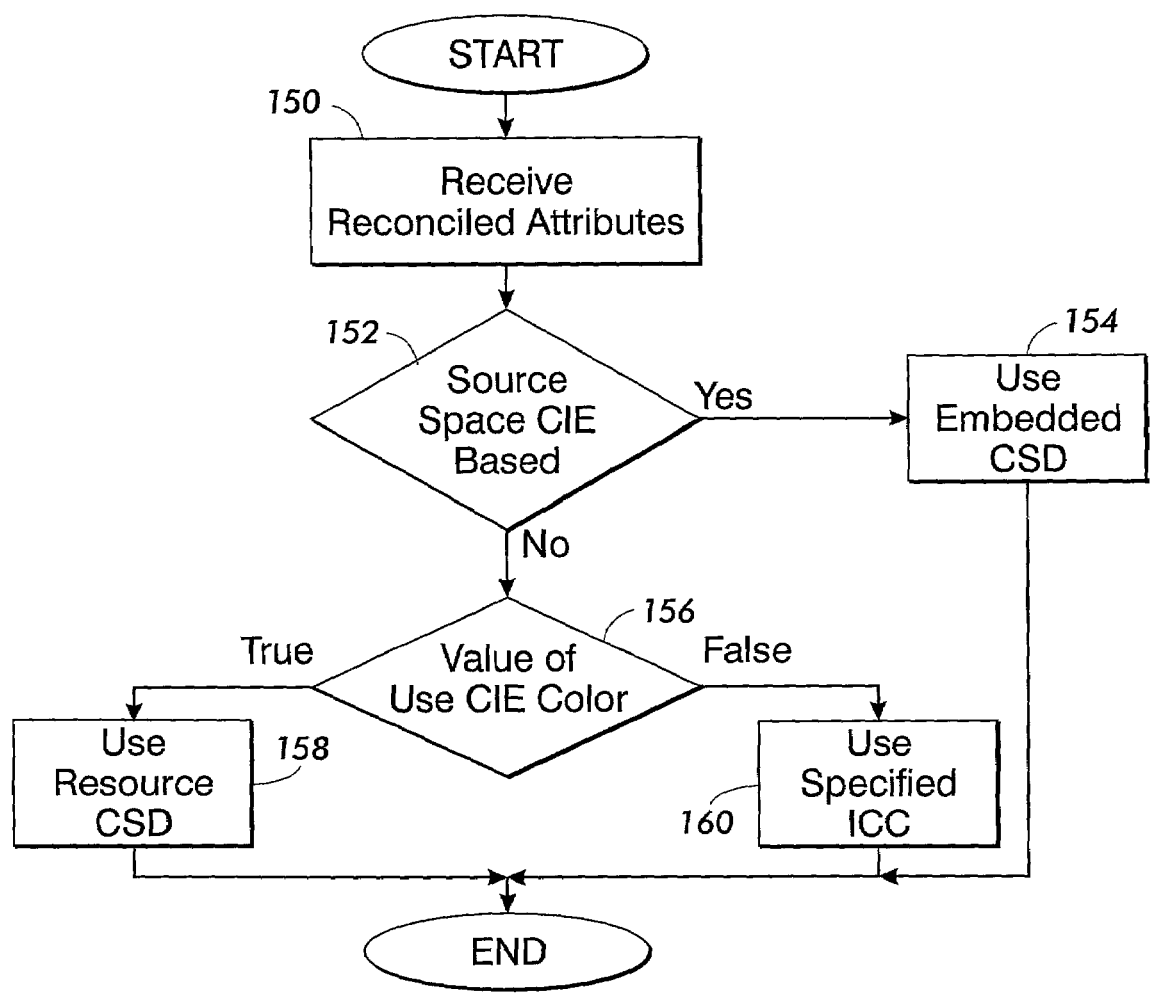
FIG. 5 is a flowchart showing the steps in resolving the source profile for a PostScript file.

Referring now to FIG. 5, there is shown a flowchart illustrating the steps in resolving the source profile for a PostScript file. At step 150, imaging manager 32 receives the reconciled attributes from job chooser 24. If imaging manager 32 encounters a CIEBased color space (step 152), it will extract the embedded CSD from the PostScript file and use it (step 154). Otherwise, the subsequent processing depends on the value of the parameter UseCIEColor in the page device dictionary (step 156). If the value of UseCIEColor is true, the imaging manager will obtain the corresponding CSD for the device source space from the PS ColorSpace resource and use it (step 158). On the other hand, if UseCIEColor is false or absent, the task-specified ICC profile is used for the device space of the PostScript (step 160).

The determination of the destination profile by imaging manager 32 will now be described. Prior to the interpretation of a page image, the imaging manager obtains the specified destination ICC profile including the value "System Specified," the object type to which the ICC profile is to be applied, the rendering intent that is to be applied to the object type, and the qualification of the named source ICC profile. In addition, imaging manager 32 will obtain the value of the emulation mode and the color related media attributes for the page. The media attributes and emulation mode are required by the profile manager 34 to identify and select the "System Specified" destination profile. If the source image was not a PDL file, imaging manager 32 uses the named destination profile (if present), otherwise, a destination ICC profile would be determined by profile manager 34 using the emulation and media attributes. Similarly, for TIFF or PCL5C input files, if the value of the destination profile attribute is not "System Specified," the imaging manager will use the named destination ICC profile and the rendering intent. On the other hand, if the value of the symbolic name is "System Specified," the appropriate destination ICC profile will be determined using the media and emulation mode attributes.

Figure 6:
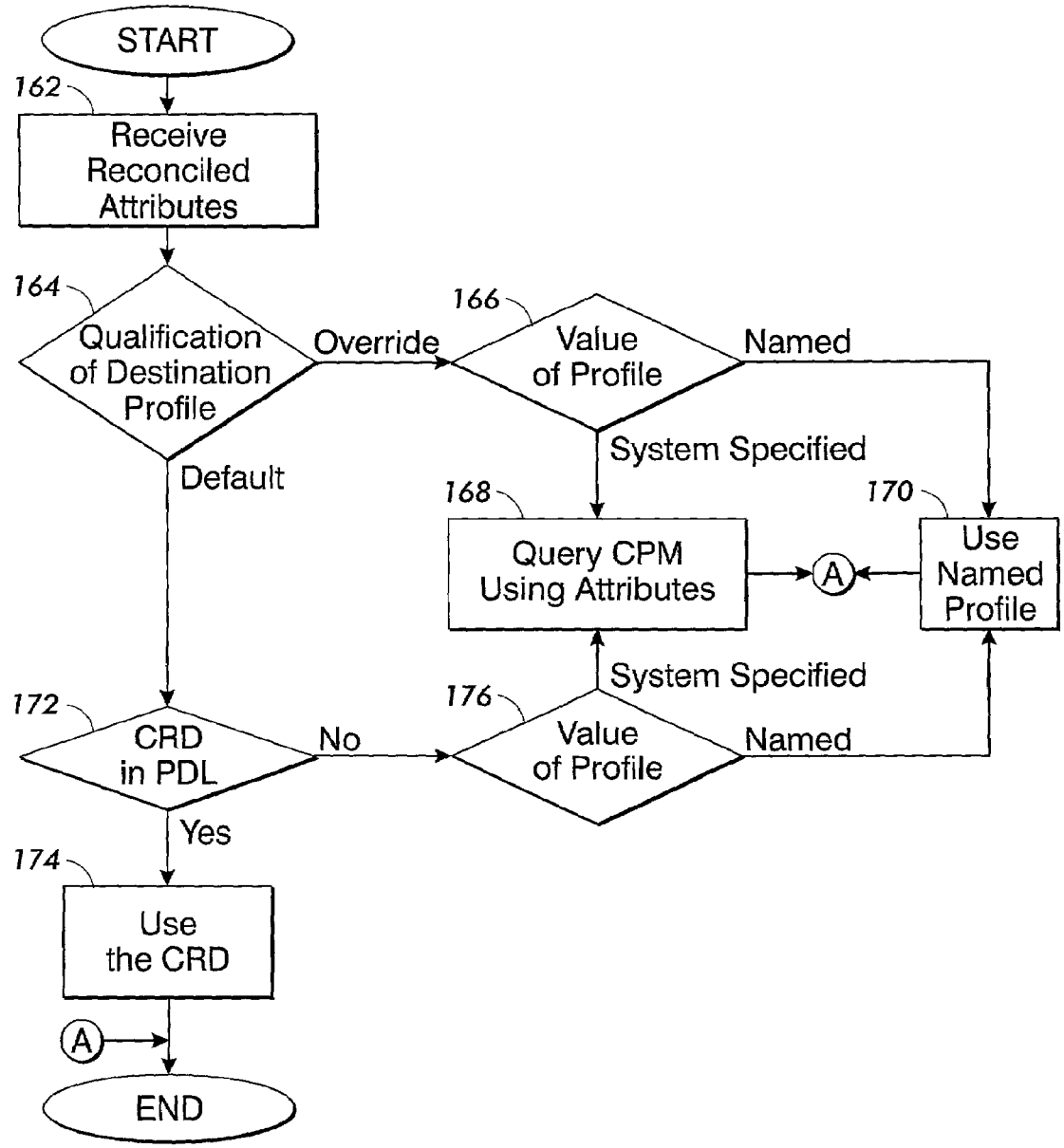
FIG. 6 is a flowchart illustrating a process for determining a destination profile for a PDL file in accordance with the present invention.

A process for determining the destination profile for a PostScript file is shown in the flowchart of FIG. 6. At step 162 imaging manager 32 receives the reconciled attributes for a page from job chooser 24. At step 164, manager 32 determines the qualification of the symbolic name representing the destination ICC profile. If the qualification is an override, the imaging manager will then determine the value (step 166). If the attribute value is "System Specified," the imaging manager will query the profile manager to determine the destination ICC profile using the emulation and media attributes (step 168). On the other hand, if the value is not "System Specified," the imaging manager will use the specified destination ICC profile (step 170). If at step 164 the imaging manager determines the qualification of the destination ICC profile is a default, the imaging manager will use the CRD that is referred to within the PostScript (steps 172 and 174). If no CRDs are referred to within the PostScript file, imaging manager 32 will determine if the destination profile is named or "System Specified" at step 176, and proceed accordingly with step 168 or step 170.

Figure 7:
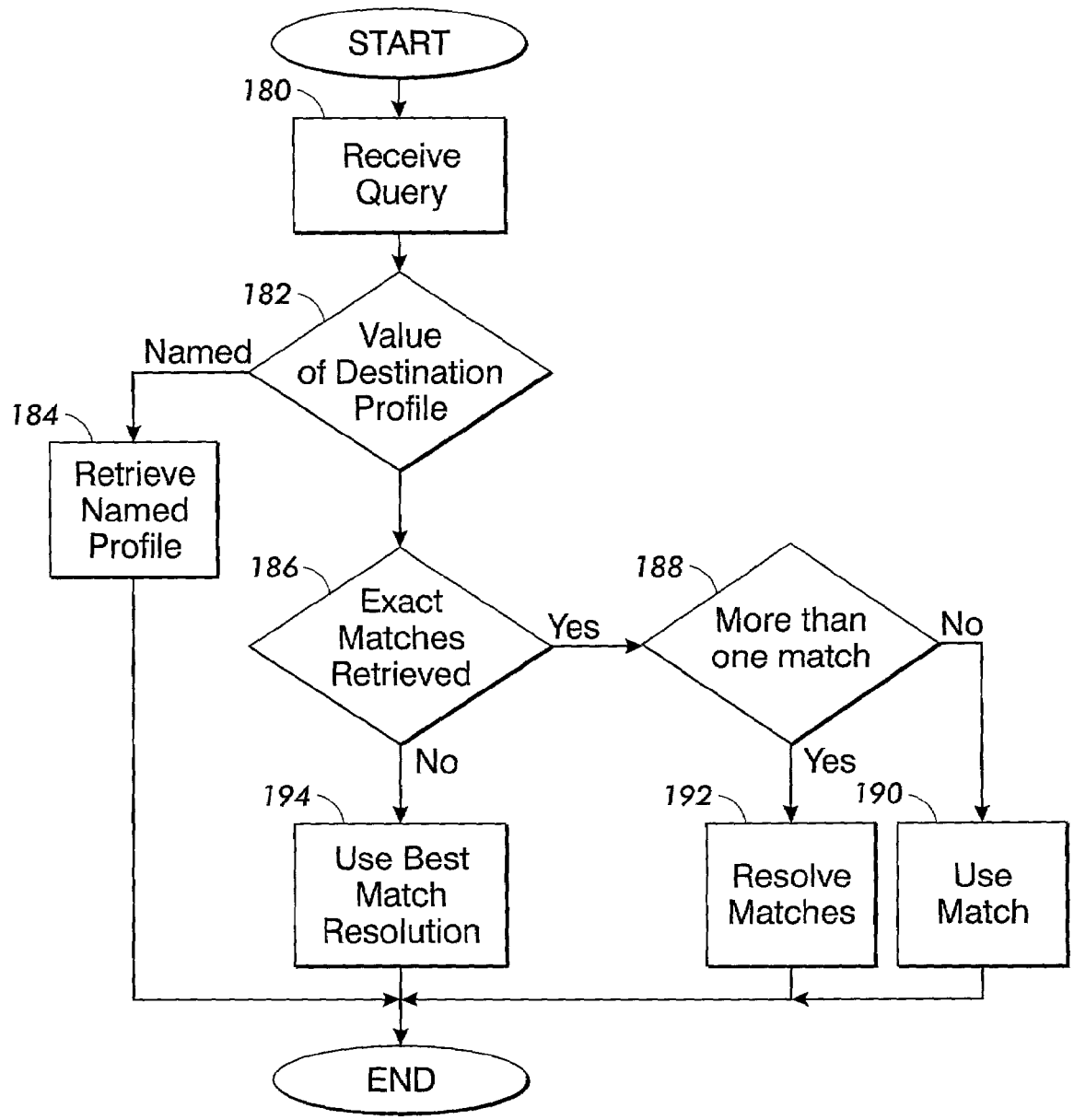
FIG. 7 is a flowchart illustrating a process for retrieving a destination profile in accordance with the present invention.

It is likely that in most cases a user will not specifically name the destination ICC profile to be used to render the job and that the value of the queue attribute for the destination profile will be set to "System Specified." In this case, the choice of the appropriate destination ICC profile is determined by the DFE (specifically, CPM 34) using the media attributes and emulation mode attribute. As described above, imaging manager 32 will generate a profile query including the values for the reconciled media, emulation and destination profile attributes. In response to the transformation query, CPM 34 identifies and retrieves the appropriate destination profile. FIG. 7 is a flowchart illustrating the steps in a process to determine the destination profile in accordance with the present invention.

The process begins at step 180 with the receipt of a transformation query. Next, at step 182, the process determines if a destination profile is named. If so, the process retrieves the named destination profile from the profile database (step 184). If the destination profile is not specifically named (i.e., unspecified or "System Specified"), the process identifies the assignment record(s), if any, having an exact match with the attribute values in the query (step 186). If only one assignment record contains an exact match, the system uses that destination profile (step 190). If more than one assignment record contains an exact match with the specified attribute values (step 188), the process performs a resolution operation to identify the destination profile to use (step 192). Specifically, resolution step 192 will use a priority model to identify the best match assignment record to use for the given media attributes. It should be noted that, as each assignment record is unique, the only time that more than one record will provide an exact match is when one or more attributes are unspecified.

The priority model will select from the matching assignment records by providing "default" values, in a selected order, for attributes that are "unspecified" until a single matching assignment record remains. For example, consider a case where the attribute values provide a specific front side coating and front side white point but leave the media name unspecified. Further, there are two different named stocks which have the same coating and white point but different weight and/or coating back and/or white point back. The priority model would select the record corresponding to the more preferred named stock, weight, coating back or white point back. The specific priority model can be preset, specified at a queue level or determined based on the current system arrangement, e.g., loaded stock.

Continuing with FIG. 7, it is quite likely that none of the assignment records is an exact match with the query. In this case, the process continues with step 194 wherein a best match resolution operation is used to identify the destination profile. A variety of best match operations are available for use. One such option applies a prioritized list of criteria until a match is found or the search criteria is exhausted. Examples of criteria for best matching are:

White point (front) variance of +/−X
Media weight variance of +/−X lbs

Given that all values of the query attributes, except for media weight, match a particular profile, the profile can be considered a best match if the media weight value is within the tolerance.

In summary, there has been described a system and method for improved color management which includes the features described above. For example, there has been a system and method that allows a user to submit a print job to a queue without selecting any color processing parameters or job attributes. The system can be configured to assign the media and associated color rendering attributes assigned to the queue to which the print job was submitted. For a more advanced user a system in accordance with the present invention permits the user to simply select the name of the media on which the job should be printed. When selecting a specific media by name, the system will automatically select the appropriate color processing associated with that media. Similarly, a user need only select one or more media attributes such as weight, coating, white point, opacity, etc. defining the properties of the media on which the print job is to be rendered. The system will identify the media that most closely corresponds to the provided attributes and process the job with the appropriate color rendering options for the identified media.

For the more advanced user, a system operating in accordance with features describe above permits a user to identify specific color rendering parameters including color space transformation profiles to be used when rendering the image data. Furthermore, the system will enable the user to identify different named color space transformation profiles to apply to each side of a media and automatically select the profile based on the media side onto which the image data will be rendered.

Although the system and method have been described in detail above, various modifications can be implemented without imparting from the spirit. Thus, while each of the system and method has been described with reference to various embodiments disclosed above, it is not confined to the details to support the above, but is intended to cover such alternatives, modifications, and variations as may come within the scope of the attached claims.

What is claimed is:

1. A method for applying individualized rendering parameters on a single page basis to enable rendering of image data associated with a job having a plurality of pages, comprising:
   (a) providing a plurality of color space transformation profiles;
   (b) assigning a first set of color processing options to a first group of pages in the job, the first group of pages in the job representing a front side of a media;
   (c) assigning a second set of color processing options to a second group of pages in the job, the second group of pages in the job representing a back side of the media, the second set of color processing options identifying a color space transformation profile;
   (d) receiving a page of image data to be rendered;
   (e) determining if the page of image data to be rendered is associated with the first group of pages in the job or associated with the second group of pages in the job;
   (f) selecting a color space transformation profile for the received page of image data when it has been determined that the page of image data to be rendered is associated with the first group of pages in the job;
   (g) selecting the color space transformation profile identified by the second set of color processing options when it has been determined that the page of image data to be rendered is associated with the second group of pages in the job; and
   (h) applying the selected color space transformation profile to render the page of image data.

2. The method of claim 1, further comprising:
   (i) rendering image data on a xerographic printing device using the selected color space transformation profile.

3. A method for applying individualized rendering parameters on a single page basis to enable rendering of image data associated with a job having a plurality of pages, comprising:
   (a) providing a plurality of color space transformation profiles;
   (b) assigning a first set of color processing options to a first group of pages in the job;
   (c) assigning a second set of color processing options to a second group of pages in the job;
   (d) receiving a page of image data to be rendered;
   (e) identifying a media side onto which the image data will be rendered;

(f) determining if the page of image data to be rendered is associated with the first group of pages in the job or associated with the second group of pages in the job;

(g) selecting a color space transformation profile being selected based upon the group association of the page of image data to be rendered and the identified media side of the page of image data to be rendered; and (i) applying the selected color space transformation profile to render the page of image data.

4. The method of claim 1, wherein the second set of color processing options further identifies at least one color space adjustment attribute.

5. The method of claim 4, wherein the color space adjustment attribute includes at least one color attribute selected from lightness, contrast, color cast, and saturation.

6. A system for selecting a color space transformation profile to enable rendering image data associated with a job having a plurality of pages, comprising:

a storage device to store and provide a plurality of color space transformation profiles;

an input device providing job programming attributes for the job, the job programming attributes including a first set of color processing options to apply to a first group of pages in the job, the first group of pages in the job representing a front side of a media, and a second set of color processing options to apply to a second group of pages in the job, the second group of pages in the job representing a back side of the media, the second set of color processing options identifying a color space transformation profile;

a color profile manager, responsive to the job programming attributes provided by the input device, to select a color space transformation profile for the received page of image data when it has been determined that the page of image data to be rendered is associated with the first group of pages in the job or the color space transformation profile identified by the second set of color processing options when it has been determined that the page of image data to be rendered is associated with the second group of pages in the job; and an imager to apply the selected color space transformation profile to the image data.

7. The system as claimed in claim 6, further comprising a xerographic printing device to generate an output image using image data processed with the selected color space transformation profile.

* * * * *